Patented Oct. 9, 1934

1,976,265

UNITED STATES PATENT OFFICE 1,976,265

MANUFACTURE OF OXIDATION PRODUCTS OF TRICHLORETHYLENE

Martin Mugdan and Josef Wimmer, Munich, Germany, assignors to Consortium für Elektrochemische Industrie, G. m. b. H., Munich, Germany, a corporation of Germany No Drawing. Application November 24, 1930, Serial No. 497,840. In Germany December 7, 1929

5 Claims. (Cl. 260—123)

It is known that trichlorethylene can be converted by the action of oxygen into oxidation products. E. Erdmann and F. W. Patzschke (J. f. prakt. Chemie 85 (1912) p. 78) have studied this reaction and established that the gases HCl, CO and COCl$_2$ are formed as products of the oxidation. Dichloracetyl chloride was found as the sole liquid product of oxidation.

We have found that the liquid oxidation product consists of about equal parts of dichloracetyl chloride and a hitherto unknown oxidation product of trichlorethylene which, like dichloracetyl chloride contains one atom of oxygen to one molecule of trichlorethylene and which probably is the ethylene oxide-like compound

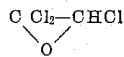

The existence of this compound had been already supposed by H. Staudinger (J. f. prakt. Chem. 85 (1912) p. 330) on theoretical grounds, as an unstable intermediate compound of the oxidation of trichlorethylene, not detectable in the end product.

In the following specification we will refer to this substance as trichlorethylene oxide for brevity, but the invention will be described in such a way that it can be performed in practice whatever may be the exact chemical constitution of the substance in question.

The boiling point of this substance lies very near to that of dichloracetyl chloride, so that it is difficult to separate it from the latter by distillation.

We have made the surprising observation that this trichlorethylene oxide, under the action of catalysts, may be converted into other isomeric compounds, with great evolution of heat, and, in fact, according to the choice of catalyst either into dichloracetyl chloride or into chloral. The conversion into chloral is not an object of this application. This conversion quickly takes place with the aid of small quantities of water free metal clorides, particularly antimonium chloride, titanium chloride, aluminum chloride and iron chloride at ordinary temperature.

The object of this invention is the conversion of the mixture of trichlorethylene oxide and dichloracetyl chloride, obtained by the oxidation of trichlorethylene with oxygen, into a high percentage of dichloracetyl chloride.

As catalysts for the formation of dichloracetyl chloride from trichlorethylene oxide we have found to be suitable organic nitrogen bases, especially secondary and tertiary amines, e. g. dimethylamine, trimethylamine, diethylamine, triethylamine, dibutylamine, tributylamine, mono- and dimethyl aniline, pyridine, piperidine, quinoline, pyrrole and also active carbon. The conversion into dichloracetyl chloride can also be obtained without the use of catalysts, by merely heating the trichlorethylene oxidation product preferably at between 100° and 200° C. This conversion occurs very slowly below the boiling point, quickly above the same. If the oxidation product is heated in a sealed tube for one hour at 200°, the trichlorethylene oxide is transformed completely into dichloracetyl chloride so that the liquid consists then, in effect, only of dichloracetyl chloride.

Preferably the raw oxidation product is freed before its conversion into the isomers, from relatively small portions of higher boiling substances, by fractional distillation.

Example

Trichlorethylene, which has previously been freed from impurities hindering its oxidation by careful fractionation is oxidized by treatment in the hot with oxygen, and the raw oxidation product freed from the admixtures boiling above 107° by fractionation. From the thus purified oxidation product, which consists of a mixture of dichloracetyl chloride, and trichlorethylene oxide, with some unchanged trichlorethylene, portions are treated at ordinary or increased temperatures with 0,1% of one of the organic bases named above as dichloracetyl chloride formers. With strong heat evolution, the conversion into dichloracetyl chloride is quickly accomplished. The dichloracetyl chloride is obtained pure and in good yield after fractionation from the trichlorethylene still contained in the product.

To control the heat evolution, the operation is preferably carried out by undertaking the conversion in such a manner that some already prepared dichloracetyl chloride is mixed with the catalyst, and into this mixture the trichlorethylene oxide containing liquid is allowed to flow with cooling and stirring, and the temperature is preferably allowed to increase, finally to about the boiling point eventually with renewed addition of a trace of catalyst if the catalyst has become rather dilute by the addition of the starting material.

According to the above process, dichloracetyl chloride, and also derivatives of the latter, dichloracetic acid, and dichloracetamide etc. may be obtained in a simple and cheap manner.

What we claim is:

1. Process of preparing oxidation products of trichlorethylene comprising oxidizing trichlorethylene to a mixture of dichloracetyl chloride and trichlorethylene oxide, and converting the trichlorethylene oxide to dichloracetyl chloride by treating this mixture with organic nitrogen bases.

2. Process of preparing oxidation products of trichlorethylene comprising oxidizing trichlorethylene to a mixture of dichloracetyl chloride and trichlorethylene oxide, and converting the trichlorethylene oxide to dichloracetyl chloride by treating this mixture with a tertiary amine.

3. Process of preparing oxidation products of trichlorethylene comprising oxidizing trichlorethylene to a mixture of dichloracetyl chloride and trichlorethylene oxide, and converting the trichlorethylene oxide to dichloracetyl chloride by treating this mixture with pyridine.

4. Process of preparing oxidation products of trichlorethylene comprising oxidizing trichlorethylene to a mixture of dichloracetyl chloride and trichlorethylene oxide, and converting the trichlorethylene oxide to dichloracetyl chloride by treating this mixture with trimethyl amine.

5. Process of preparing oxidation products of trichlorethylene comprising oxidizing trichlorethylene to a mixture of dichloracetyl chloride and trichlorethylene oxide, and converting the trichlorethylene oxide to dichloracetyl chloride by treating this mixture with triethyl amine.

MARTIN MUGDAN.
JOSEF WIMMER.